US012643216B1

(12) United States Patent
Macdonald

(10) Patent No.: US 12,643,216 B1
(45) Date of Patent: Jun. 2, 2026

(54) IMPACT REDUCTION HANDLE FOR HAMMER

(71) Applicant: Dustin J Macdonald, Kapaa, HI (US)

(72) Inventor: Dustin J. Macdonald, Kapaa, HI (US)

( * ) Notice: Subject to any disclaimer, the term of this patent is extended or adjusted under 35 U.S.C. 154(b) by 0 days.

(21) Appl. No.: 19/354,145

(22) Filed: Oct. 9, 2025

(51) Int. Cl.
*B25G 1/02* (2006.01)

(52) U.S. Cl.
CPC .................................... *B25G 1/02* (2013.01)

(58) Field of Classification Search
CPC ... B25G 1/01; B25G 1/02; B25G 1/10; B25D 1/12
See application file for complete search history.

(56) References Cited

U.S. PATENT DOCUMENTS

| | | | | |
|---|---|---|---|---|
| 851,707 | A * | 4/1907 | Tarbell | B25D 1/12 81/22 |
| 1,158,032 | A * | 10/1915 | Eastman | B25D 1/12 81/22 |
| 2,467,284 | A | 4/1949 | Williams | |
| 3,578,825 | A | 5/1971 | Merrow et al. | |
| 3,613,753 | A * | 10/1971 | Wolf | B29C 70/545 273/DIG. 7 |
| 4,089,356 | A * | 5/1978 | O'Connor | B25G 3/10 81/22 |
| 4,633,741 | A * | 1/1987 | Yang | B25G 1/01 81/19 |
| 5,280,739 | A | 1/1994 | Liou | |
| 5,490,437 | A * | 2/1996 | Hebert | B25G 3/28 81/22 |
| 6,202,511 | B1 * | 3/2001 | Murray | B25G 1/01 81/22 |
| 6,220,128 | B1 * | 4/2001 | Hu | B25G 1/01 81/22 |
| D446,705 | S | 8/2001 | Stinnissen | |
| 6,405,616 | B1 | 6/2002 | Chen | |
| 6,763,747 | B1 | 7/2004 | Gierer et al. | |
| RE38,892 | E | 11/2005 | Ryu | |
| 7,066,052 | B2 | 6/2006 | Chen | |

(Continued)

FOREIGN PATENT DOCUMENTS

| | | | |
|---|---|---|---|
| CN | 103358285 | A | 10/2013 |
| CN | 103770081 | A | 5/2014 |

(Continued)

OTHER PUBLICATIONS

Nanovib, "Nanovib® Carpenter's Hammer with Protrusion," retrieved on Jun. 25, 2025 at https://www.leborgne.es/herramientas-profesionales/martillos-de-constructor-de-casas-de-estructura-de-madera/martillo-de-carpintero-nanovib-con-saliente.html.

Fiskars Pro, "Shock Absorbing Hammer," retrieved on Jun. 25, 2025 at https://disabilityworkconsulting.com/product/shock-absorbing-hamme/.

(Continued)

*Primary Examiner* — David B. Thomas
(74) *Attorney, Agent, or Firm* — Bochner PLLC; Matthew J. May

(57) ABSTRACT

An improved handle for hammers and other swing-handle tools designed to reduce the shock of impact during use. The handle features a longitudinal gap running approximately halfway up from the bottom end of the handle, creating a tuning fork-like structure that flexes upon impact. This design significantly reduces recoil and vibration, offering improved comfort, control, and protection for the user's hand, wrist, and arm. The handle is made of traditional wood materials and is compatible with standard hammer heads.

20 Claims, 20 Drawing Sheets

(56) References Cited

U.S. PATENT DOCUMENTS

| | | | | |
|---|---|---|---|---|
| 8,113,091 | B2 | 2/2012 | Chen | |
| 8,499,665 | B2 * | 8/2013 | St. John | B25D 1/045 81/22 |
| 10,421,179 | B2 * | 9/2019 | Liu | B25D 1/12 |
| 10,464,198 | B1 | 11/2019 | Steidtmann | |
| D934,646 | S | 11/2021 | Hutchens | |
| 11,607,798 | B2 | 3/2023 | Liou | |
| 2008/0282853 | A1 * | 11/2008 | Young | B25G 1/10 81/489 |
| 2021/0323133 | A1 | 10/2021 | Imsand et al. | |
| 2022/0314425 | A1 | 10/2022 | Fontenot et al. | |

FOREIGN PATENT DOCUMENTS

| | | | |
|---|---|---|---|
| CN | 204382225 | U | 6/2015 |
| CN | 204382226 | U | 6/2015 |
| CN | 108115619 | A | 6/2018 |
| CN | 215825258 | U | 2/2022 |
| CN | 218905264 | U | 4/2023 |
| CN | 119347695 | A | 1/2025 |
| CN | 222405544 | U | 1/2025 |
| KR | 20100111214 | A | 10/2010 |
| MX | 00002288 | A | 6/2002 |

OTHER PUBLICATIONS

Ldbuejiaja, "Professional Hammer with Vibrations Damping and Easy Grip Handle for Outdoor Indoor Use Craftsmen and Diyer Enthusiasts," retrieved on Jun. 25, 2025 at https://www.amazon.in/Professional-Vibrations-Damping-Craftsmen-Enthusiasts/dp/BODPX7B628.

Stiletto, "Stiletto Tb3Sc 15 oz Tibone Iii Titanium Hammer with Smooth Face Curved Handle," retrieved on Jun. 25, 2025 at https://oman.whizzcart.com/product/14292312/stiletto-tb3sc-15-oz-tibone-iii-titanium-hammer-with-smooth-face-curved-handle/.

Oudisi, "Oudisi Frame Hammer 16 oz Straight Claw Hammer, Integrally Forged Magnetic Roof Hammer with Magnetic Nail Puller, Shock-Absorbing Handle Nail Hammer, Steel Hammer, Hammer Tool," retrieved on Jun. 25, 2025 at https://www.retailmarket.net/products/oudisi-frame-hammer-16oz-straight-claw-hammer-integrally-forged-magnetic-roof-hammer-with-magnetic-nail-puller-shock-absorbing-handle-nail-hammer-steel-hammer-hammer-tool/(010083.00002).

Stanley, "Stanley 51-952 FatMax 24 oz Anti-Vibration Claw Hammer," retrieved on Jun. 25, 2025 at https://alliancehardware.com.au/product/stanley-51-952-fatmax-24oz-anti-vibration-claw-hammer/.

Stevo J, YouTube Video, "Split Hammer Handle Repair," retrieved from https://www.youtube.com/watch?V=VsRuddb8n2Q on Oct. 27, 2025.

* cited by examiner

IMPACT REDUCTION HANDLE FOR HAMMER

FIELD OF INVENTION

The present invention relates to hand tools, specifically to an improved handle design for swing handle tools such as hammers, which significantly reduces impact shock during use, enhancing user comfort and reducing the risk of injury.

BACKGROUND

Traditional swing handle tools, such as hammers, are widely used in construction, woodworking, and other industries. However, the repetitive impact forces generated during use can cause significant strain on the user's hand, wrist, forearm, and elbow. Prolonged use of such tools often leads to discomfort, fatigue, and potential injuries, including repetitive strain injuries (RSI). Existing solutions, such as cushioned grips or ergonomic designs, provide limited relief and do not adequately address the transmission of impact shock through the tool handle. There is a need for a hammer handle design that effectively reduces impact shock while maintaining the durability and functionality of traditional hammer handles.

BRIEF SUMMARY

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

The present invention provides an impact reduction handle for swing handle tools, such as hammers, designed to significantly reduce the shock transmitted to the user during operation. The handle features a central gap, approximately ¼ inch wide, extending halfway up the handle from the bottom, creating a "tuning fork-like effect." This design absorbs a substantial portion of the impact force, reducing strain on the user's hand, wrist, forearm, and elbow. The handle is constructed from traditional materials, such as wood, using standard manufacturing processes, ensuring compatibility with existing tool designs. The gap includes curved edges at the bottom to minimize the risk of pinching, enhancing user safety. The impact reduction handle offers minimal recoil, improving control and accuracy, and provides a more comfortable and efficient experience for users in construction, woodworking, and related applications.

The present invention provides an impact reduction hammer with a handle that incorporates a center gap along the lower portion of the handle, resulting in a tuning fork-like effect that reduces impact shock and recoil. The gap begins at the bottom of the handle and extends approximately halfway up the handle's length.

This design allows the handle to flex and absorb energy during striking, dissipating a significant portion of the shock that would otherwise be transferred to the user's hand and arm. The design maintains the traditional wooden material and manufacturing processes associated with standard hammer handles. The curved bottom edges of the central gap reduce the risk of pinching, while the tuned flexural properties of the handle provide greater control and precision.

In some examples, a swing-handle tool may comprise a tool head and an impact reduction handle coupled to the tool head. The impact reduction handle may have a first end coupled to the tool head and a second end opposite the first end. The second end may include a central gap extending axially from a bottom end of the handle toward the first end. The central gap may divide a lower portion of the handle into two parallel prongs configured to flex laterally during impact so as to reduce transmission of shock forces to a user. The central gap may extend approximately halfway along a length of the handle. The central gap may have a width between about ⅛ inch and about ½ inch, or approximately ¼ inch. The bottom end of the handle may have a generally circular cross-section bisected by the central gap. The central gap may define a longitudinal slot terminating at an interior end with a curved wall to facilitate flexing of the prongs. The bottom end may comprise two opposing arcuate sections each having an outer curved surface and an inner straight surface defining the central gap. The inner straight surfaces may include opposing edges adjacent the slot, the edges being smoothly curved at the bottom end to minimize fracture risk and reduce pinching during use. The outer curved surfaces may include peripheral edges that are smoothly rounded to create a continuous curved perimeter at the bottom end. Each of the opposing arcuate sections may include corners defined between the outer curved surface and the inner straight surface, the corners being filleted to reduce stress concentrations. The corners may be free of sharp angles and smoothly contoured to minimize fracture risk and improve user safety. The lower portion of the handle may be configured to absorb secondary striking forces without structural failure. The central gap may provide a tuning-fork-like effect that dissipates energy through flexural vibration.

In some examples, a method for reducing impact shock in a swing-handle tool, the method of comprising the steps of: 1) providing a handle having a central gap extending axially from a bottom end of the handle toward an opposite end coupled to a tool head; 2) dividing a lower portion of the handle into two prongs separated by the central gap; and 3) absorbing and dissipating shock forces by flexing of the prongs during impact to reduce transmission of the shock forces to a user's hand. The method may further comprise shaping corners of the prongs with fillets and rounded edges to reduce stress concentrations during repeated impact loading. The method may further comprise terminating the central gap in a curved wall to facilitate controlled flexing of the prongs. The flexing of the prongs may generate a tuning-fork-like vibration that dissipates impact energy.

In some examples, a hammer may comprise a hammer head and an impact reduction handle coupled to the hammer head. The handle may include a bottom end having a generally circular cross-section bisected by a longitudinal slot extending axially upward from the bottom end to divide the handle into two arcuate prongs. The prongs may be configured to flex during impact to reduce transmission of shock forces. The longitudinal slot may be approximately ¼ inch in width and extends approximately halfway up the length of the handle. The arcuate prongs each may include outer curved surfaces and inner straight surfaces defining the slot. The outer curved surfaces and inner straight surfaces may include rounded edges to reduce fracture risk. Each of the opposing arcuate sections includes corners may be defined between the outer curved surface and the inner straight surface. The corners may be filleted, free of sharp angles, and smoothly contoured to minimize fracture risk and improve user safety. The longitudinal slot may terminate at a curved interior wall that facilitates flexing of the prongs during impact.

These and various other features will be described more fully herein.

BRIEF DESCRIPTION OF THE DRAWINGS

The present invention is illustrated by way of example and not limited in the accompanying figures in which like reference numerals indicate similar elements and in which.

Further, it is to be understood that the drawings may represent the scale of different components of one single embodiment; however, the disclosed embodiments are not limited to that particular scale.

DETAILED DESCRIPTION

An improved handle for hammers and other swing-handle tools designed to reduce the shock of impact during use. The handle features a longitudinal gap running approximately halfway up from the bottom end of the handle, creating a tuning fork-like structure that flexes upon impact. This design significantly reduces recoil and vibration, offering improved comfort, control, and protection for the user's hand, wrist, and arm. The handle is made of traditional wood materials and is compatible with standard hammer heads.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope and spirit of the present disclosure.

Figure 1:
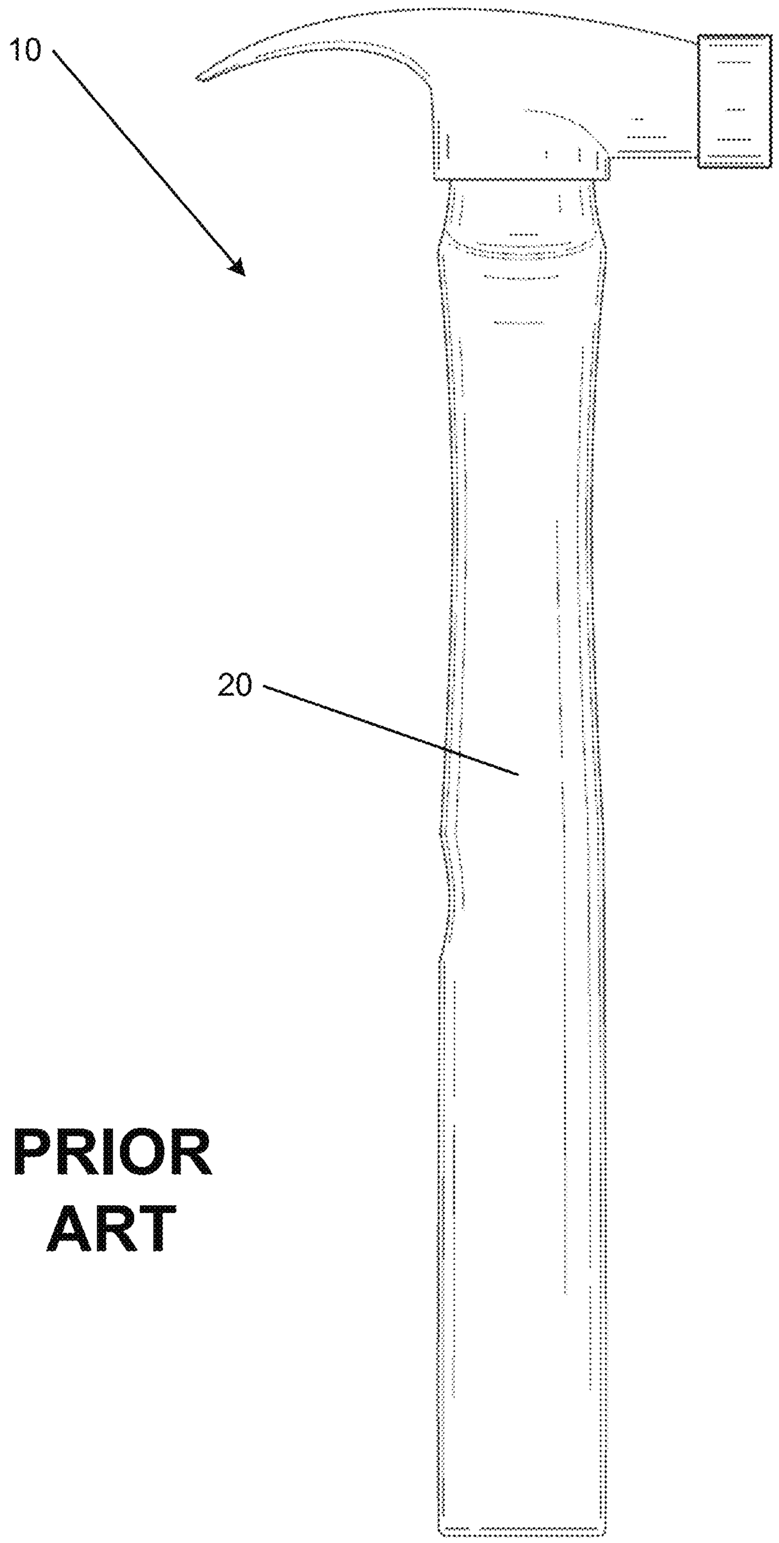
FIG. 1 is a side view of a prior art hammer.
Figure 2A:
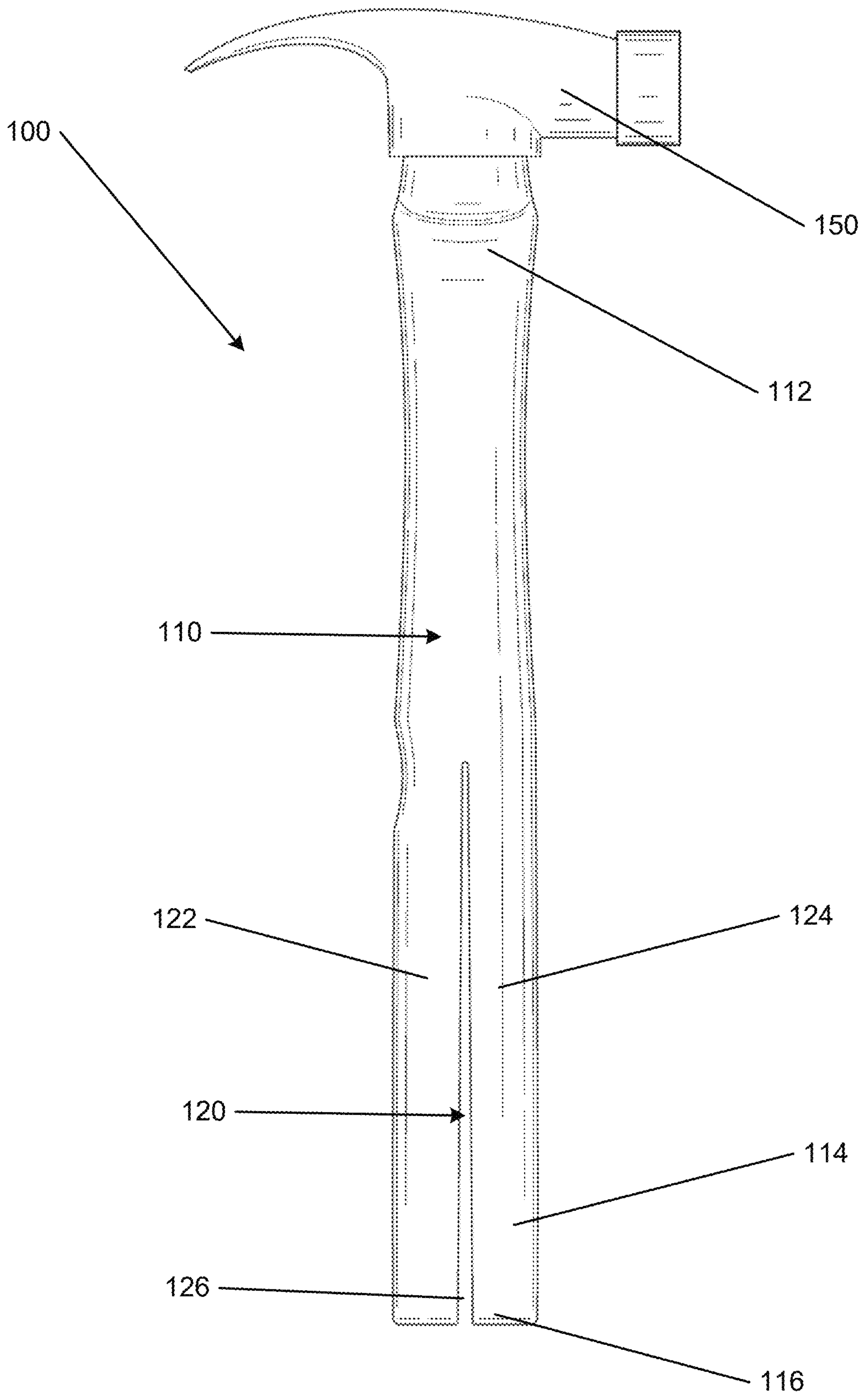
FIGS. 2A and 2B are side views of an impact reduction hammer according to one or more aspects described herein.
Figure 2B:
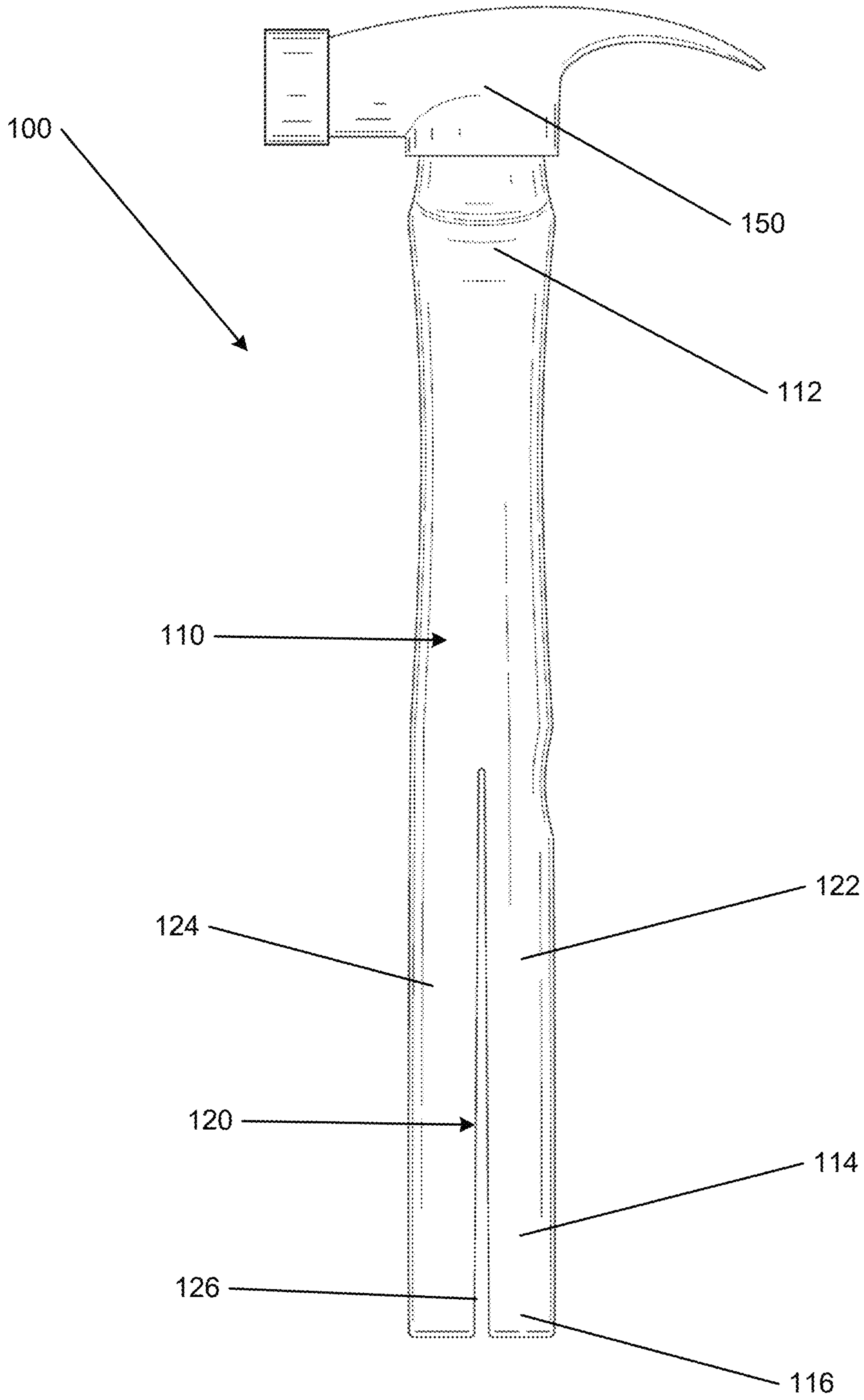
Figure 2C:
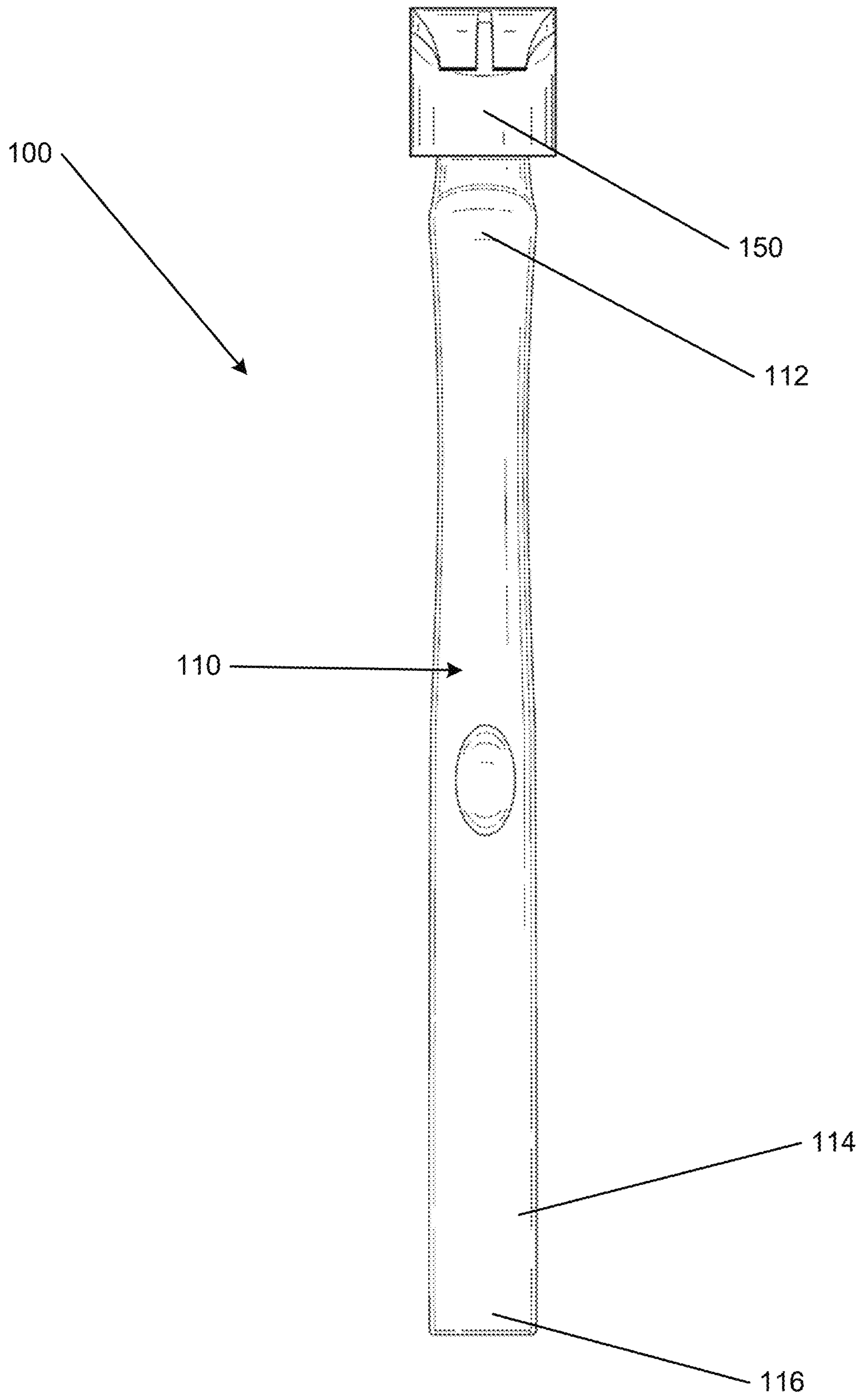
FIG. 2C is a rear view of the impact reduction hammer depicted in FIG. 2A according to one or more aspects described herein.
Figure 3A:
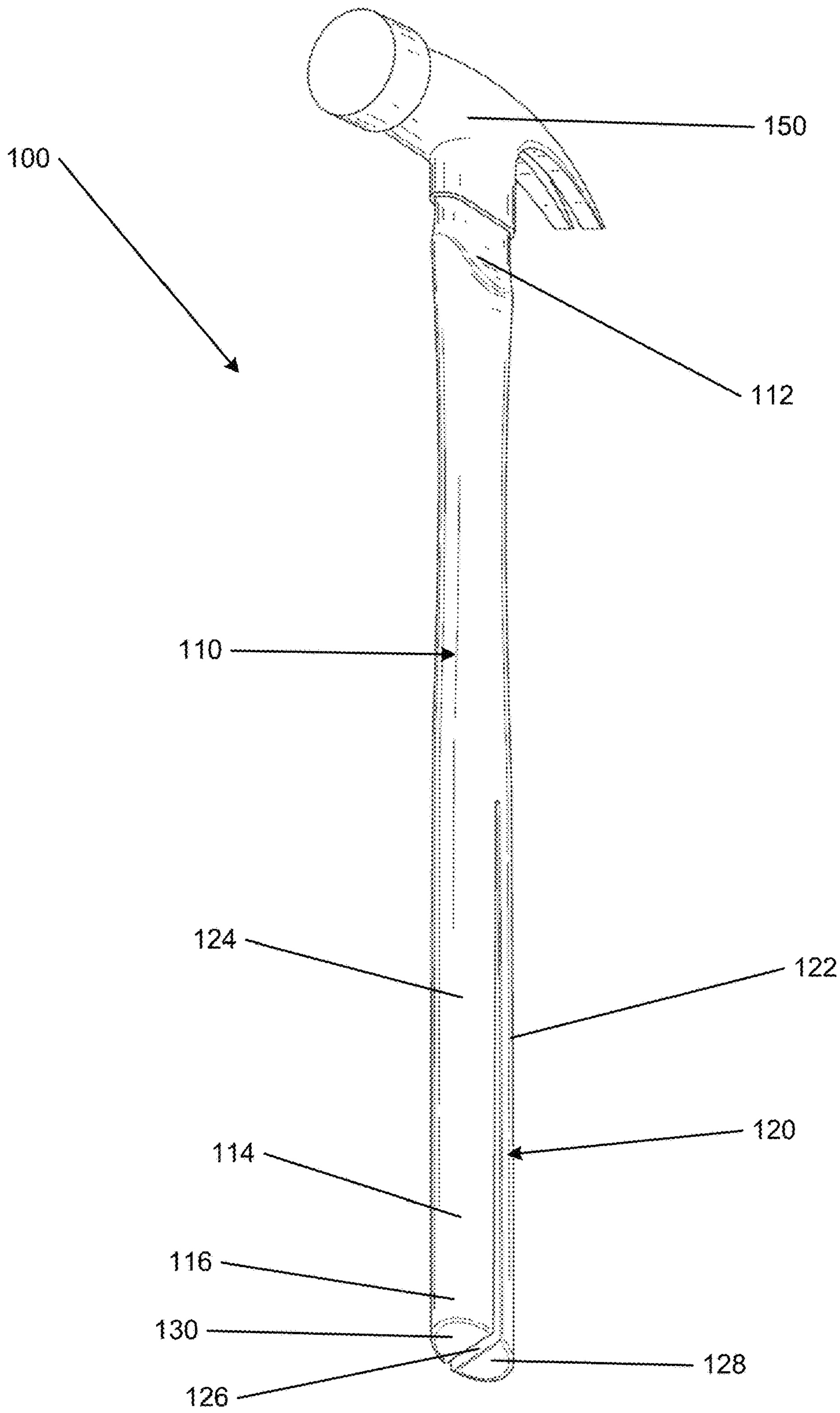
FIG. 3A is a front perspective view of the impact reduction hammer depicted in FIG. 2A according to one or more aspects described herein.
Figure 3B:
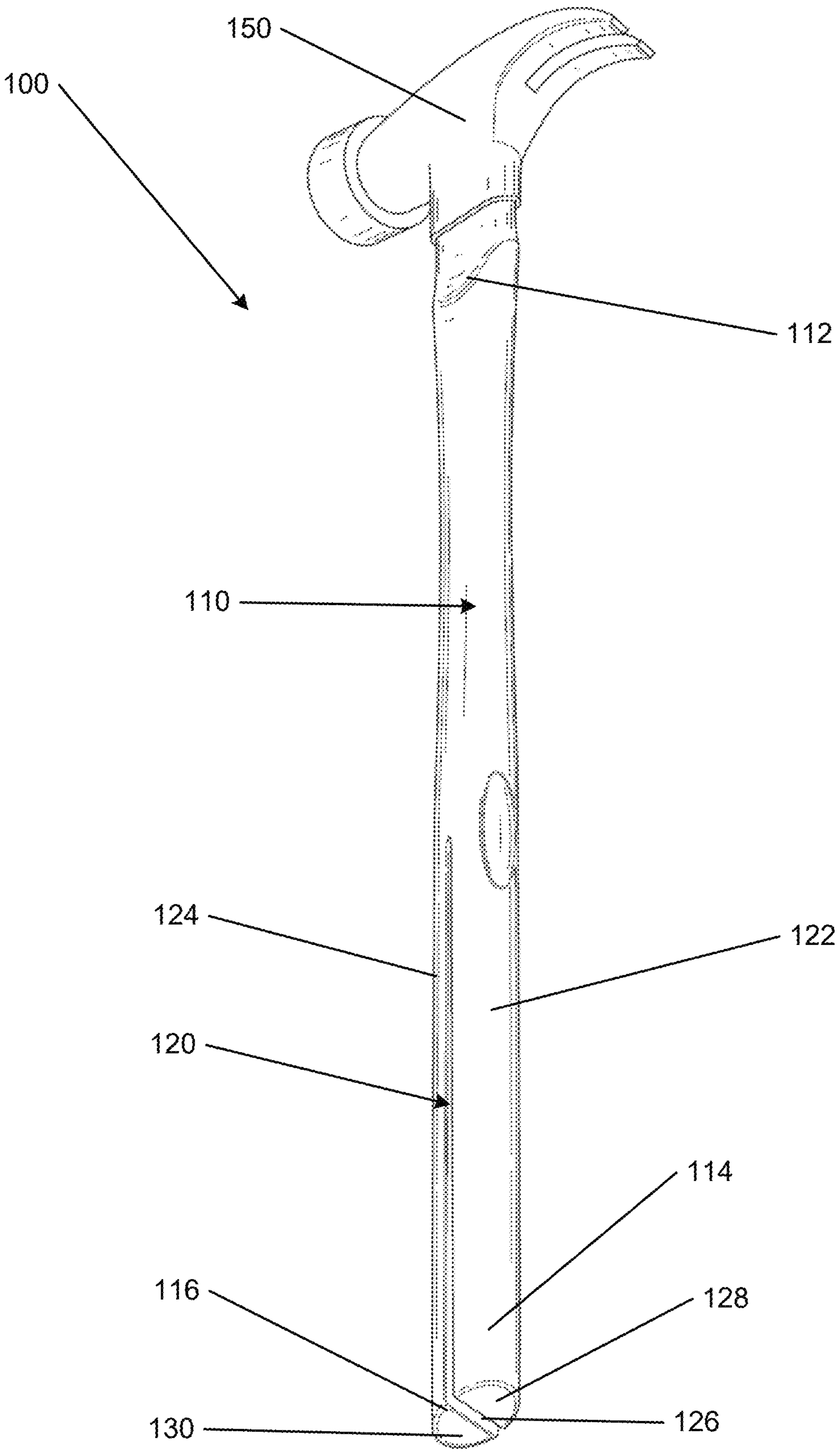
FIG. 3B is a rear perspective view of the impact reduction hammer depicted in FIG. 2A according to one or more aspects described herein.
Figure 4A:
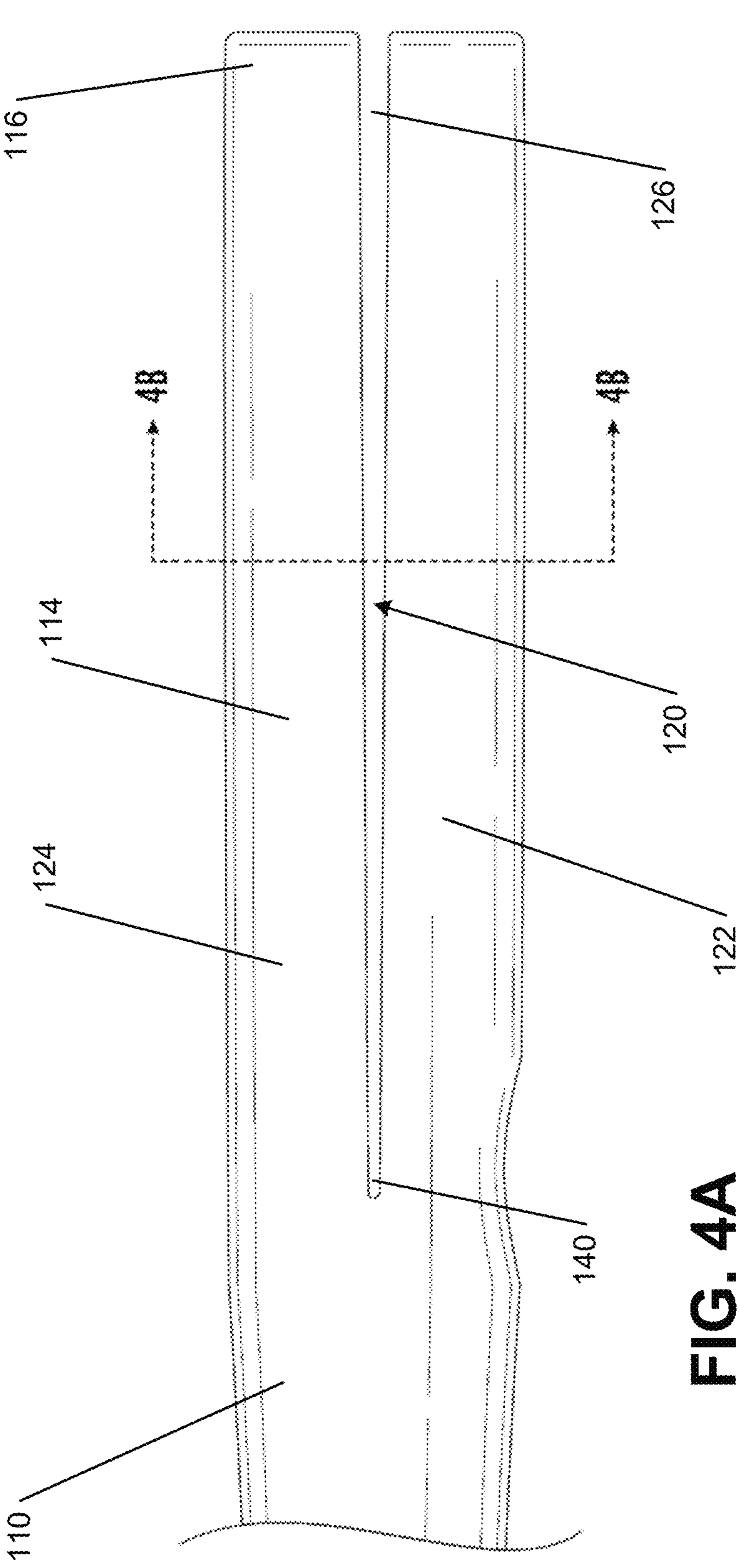
FIG. 4A is a close-up side view of a handle on the impact reduction hammer depicted in FIG. 2A according to one or more aspects described herein.
Figure 4B:
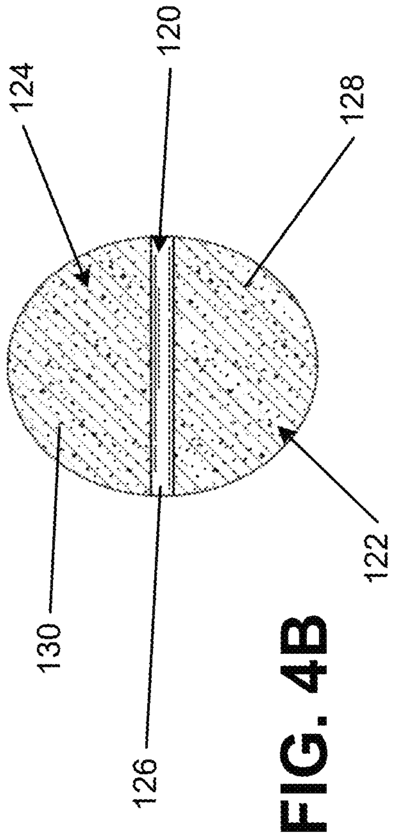
FIG. 4B is a cross-sectional view along 4B-4B of the handle depicted in FIG. 4A according to one or more aspects described herein.

Referring now to the figures (not included in this draft), the invention comprises a hammer (or other swing-handle tool) with a novel impact reduction handle. FIG. 1 depicts a traditional swing handle tool, such as a hammer 10 that is widely used in construction, woodworking, and other industries. As shown, the hammer 10 includes a handle 20 that provides limited relief and does not adequately address the transmission of impact shock through the tool handle. Therefore, there is a need for a hammer handle design that effectively reduces impact shock while maintaining the durability and functionality of traditional hammer handles.

The present invention is an impact reduction handle for swing handle tools, such as hammers, designed to mitigate the shock experienced by the user during operation. As shown in FIGS. 2A-5B, a hammer 100 may include an impact reduction handle 110 with a hammer head 150 attached the impact reduction handle 110. The impact reduction handle 110 may include an upper portion 112 that attaches to the hammer head 150 and a lower portion 114 that includes the impact reduction feature. The hammer head 150 may be attached to the impact reduction handle 110 at the upper portion 112 by a variety of methods known and used in the art, such as, epoxy or adhesive bonding, pinned connection, integral molding, mechanical locking collar or sleeve, wooden wedge and/or metal wedge locking system, or any other methods known and used in the art. As will be detailed and depicted in more detail in FIGS. 6-16, the hammer head 150 may be various swing handle tool heads without departing from this invention.

The impact reduction handle 110 may include an upper portion 112 and a lower portion 114 opposite the upper portion 112. The lower portion 114 may include a central gap 120 extending from a bottom end 116 of the handle 110. The central gap 120 may extend from the bottom end 116 of the handle 110 to approximately midway up the handle 110.

The central gap 120 may be approximately ¼ inch wide, extending from the bottom 116 of the handle 110 to approximately halfway up its length. The central gap 120 may be other thicknesses without departing from this invention, similar to ¼ inch wide, such as ⅛ inch, ⅜ inch, ½ inch, ⅝ inch, or 4/4 inch. Additionally, the central gap 120 may extend other distances up the handle 110 without departing from this invention, such as approximately 25% up the length, 40% up the length, 60% up the length, or 75% up the length. The central gap 120 creates a "tuning fork-like effect," allowing the handle 110 to flex slightly upon impact, thereby absorbing a significant portion of the impact force.

One of the key components of the impact reduction handle 110 is the central gap 120 beginning at the bottom 116 of the handle 110 and extends upward approximately halfway through the handle's length. The central gap 120 may be centered within a width of the handle 110. The central gap 120 may create two parallel prongs 122, 124 in the lower portion 114 of the handle 110, resembling a tuning fork. The central gap 120 may divide the lower half of the handle 110 into two parallel sections or prongs 122, 124, resembling the tines of a tuning fork. This configuration allows the handle 110 to flex slightly upon impact, dissipating the shock before it reaches the user's hand.

The central gap 120 allows lateral flex in the lower portion 114 of the handle 110, particularly during high-energy impacts, such as when the hammer strikes a nail or chisel. This flexural response behaves similarly to a tuning fork, with energy absorbed and dissipated through mechanical vibration rather than transferred to the user's grip. This lower portion 114 of the handle 110 is configured to provide impact resistance, enabling the handle 110 itself to withstand secondary striking forces or incidental impacts during use.

Figure 5A:
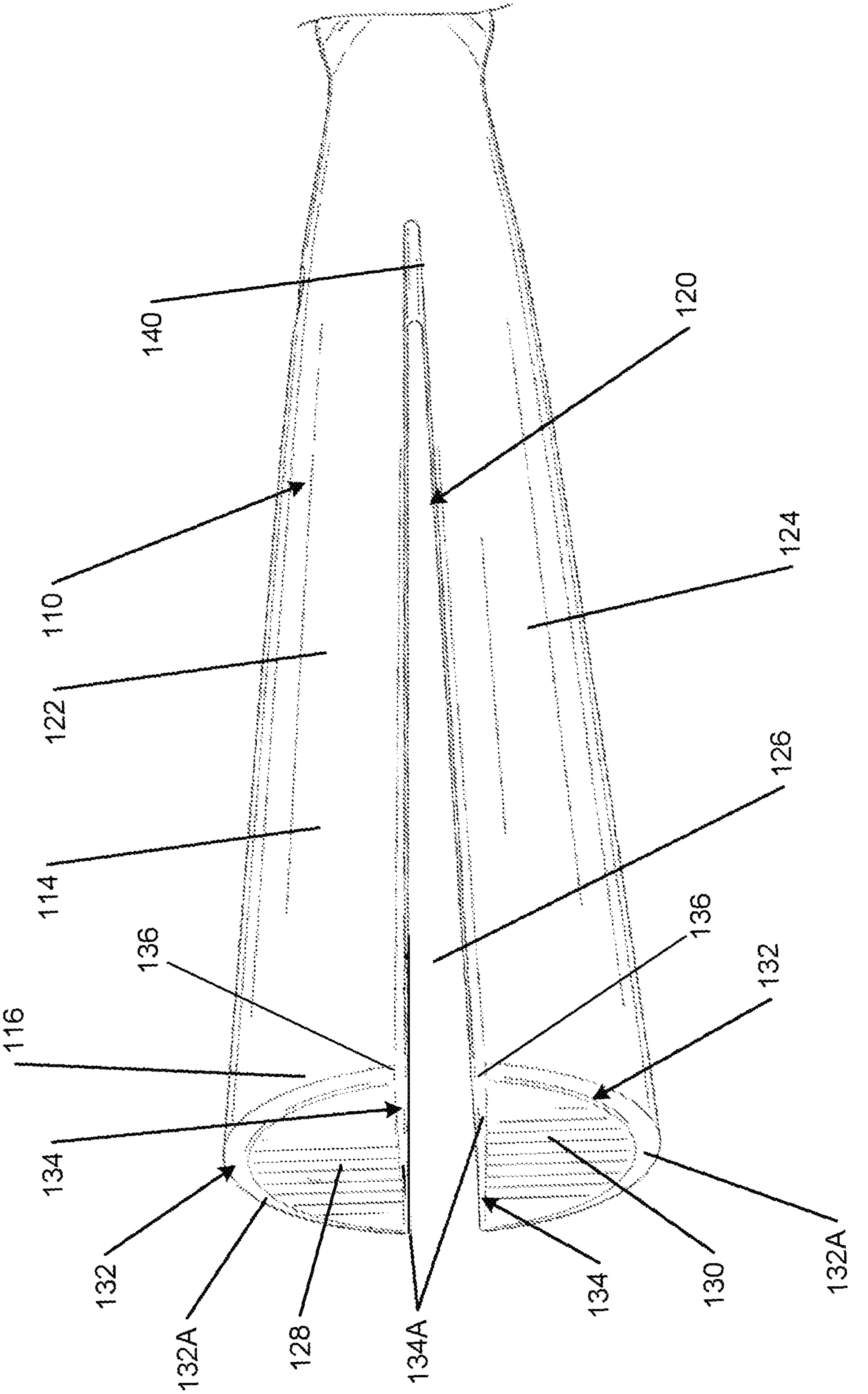
FIG. 5A is a close-up side perspective view of the handle on the impact reduction hammer depicted in FIG. 2A according to one or more aspects described herein.
Figure 5B:
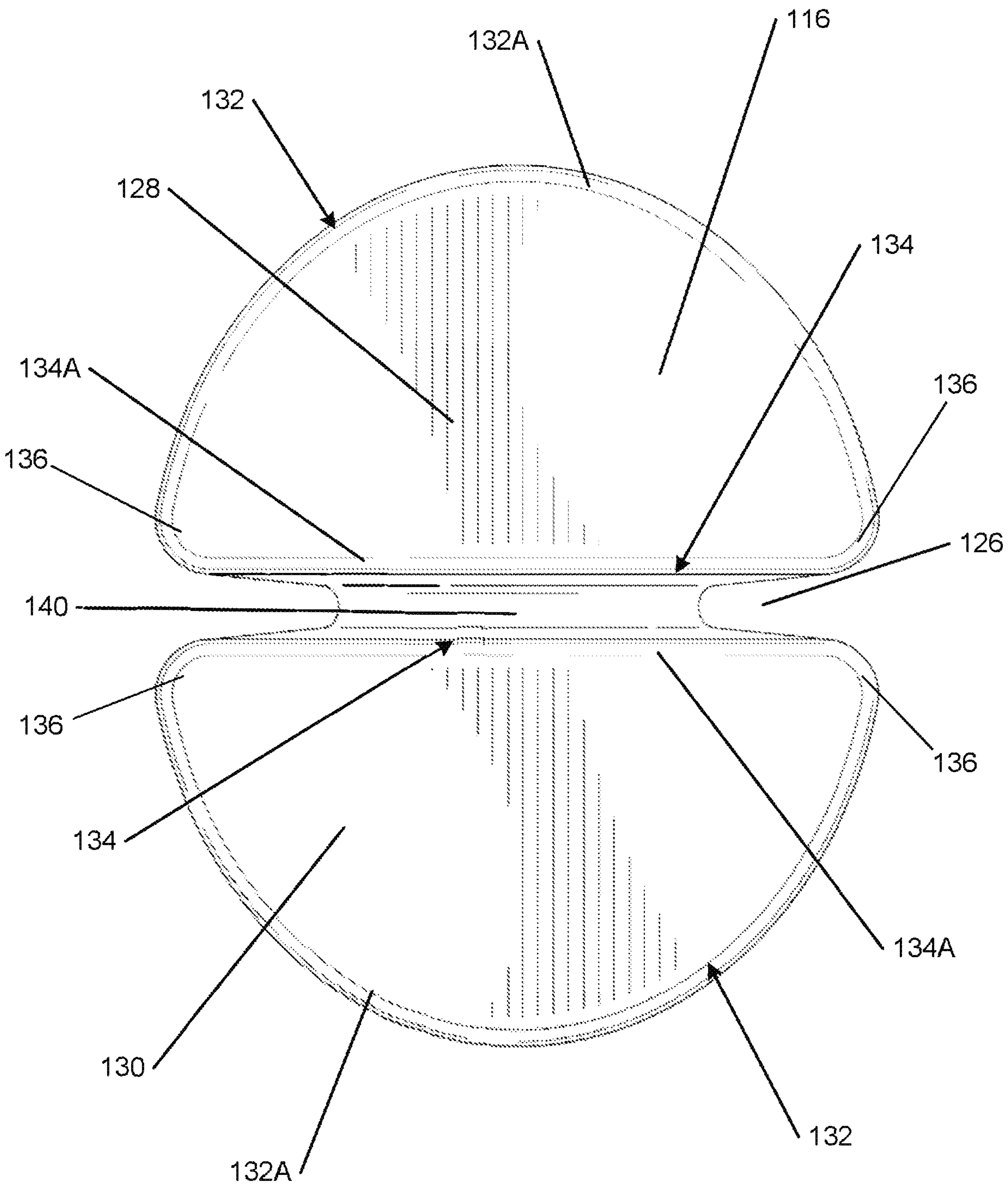
FIG. 5B is a bottom view of the handle on the impact reduction hammer depicted in FIG. 2A according to one or more aspects described herein.
Figure 6:
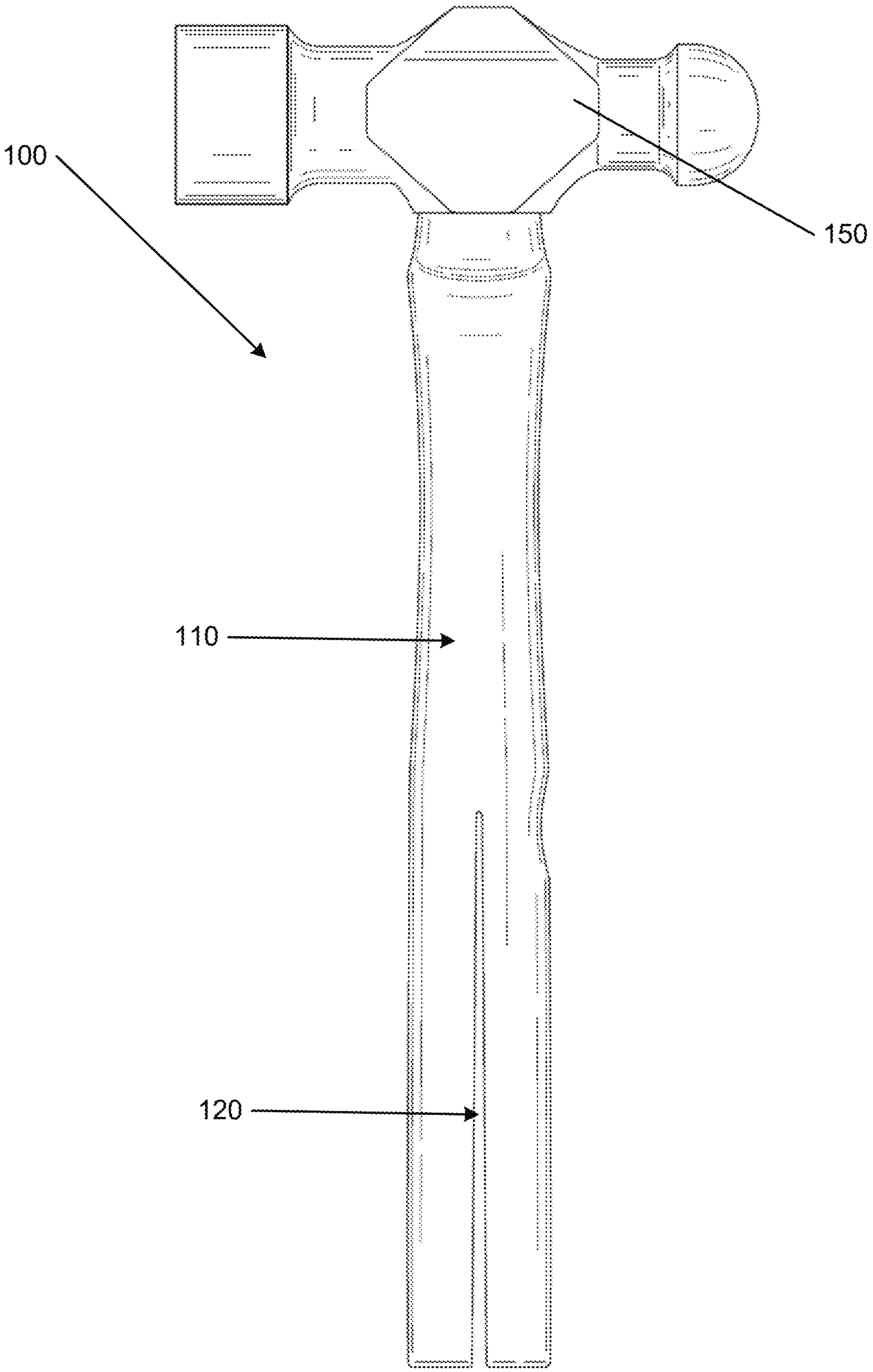
FIGS. 6-16 are side views of various other swing-handle tools with an impact reduction handle according to one or more aspects described herein.
Figure 7:
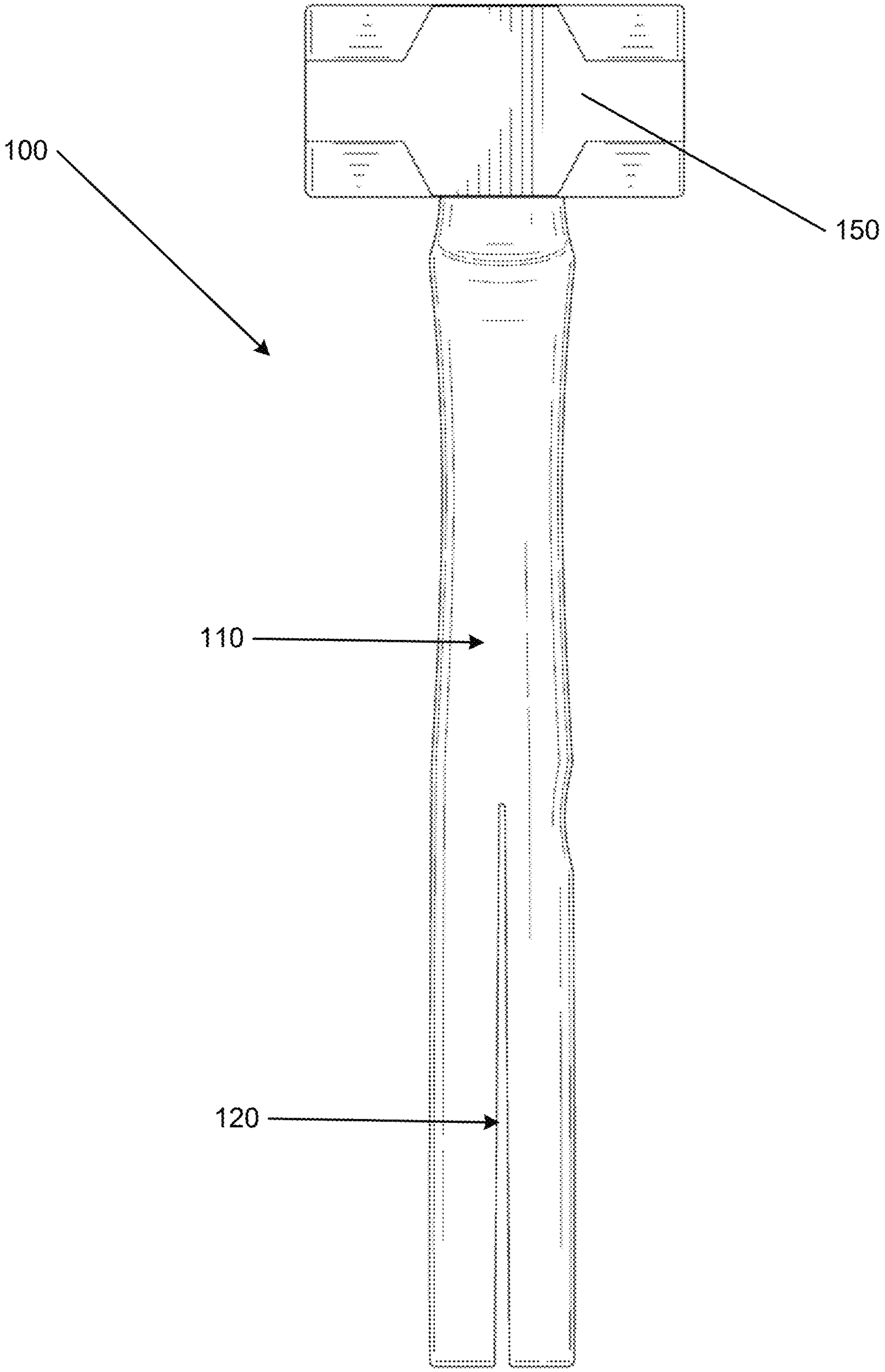
Figure 8:
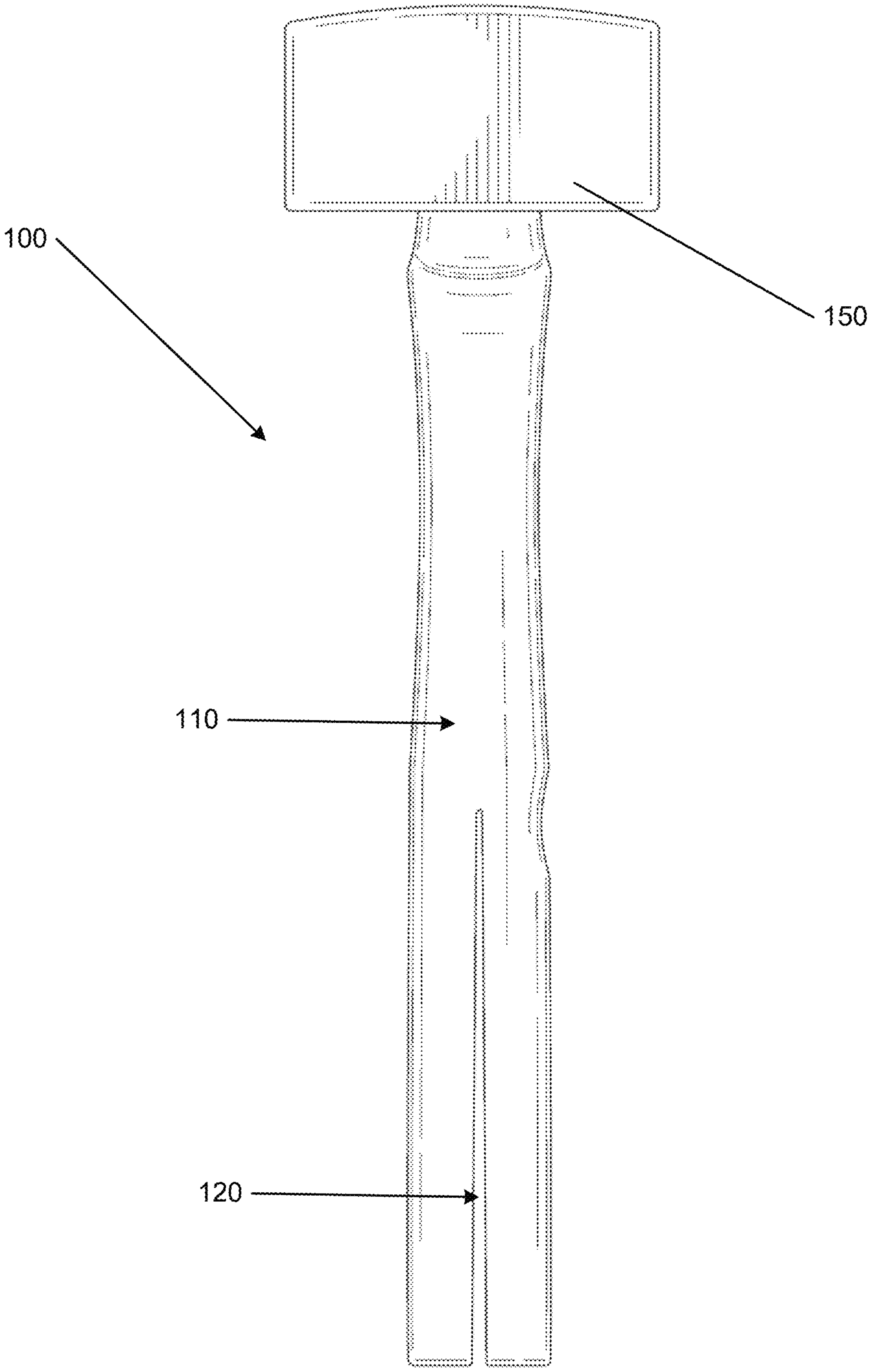
Figure 9:
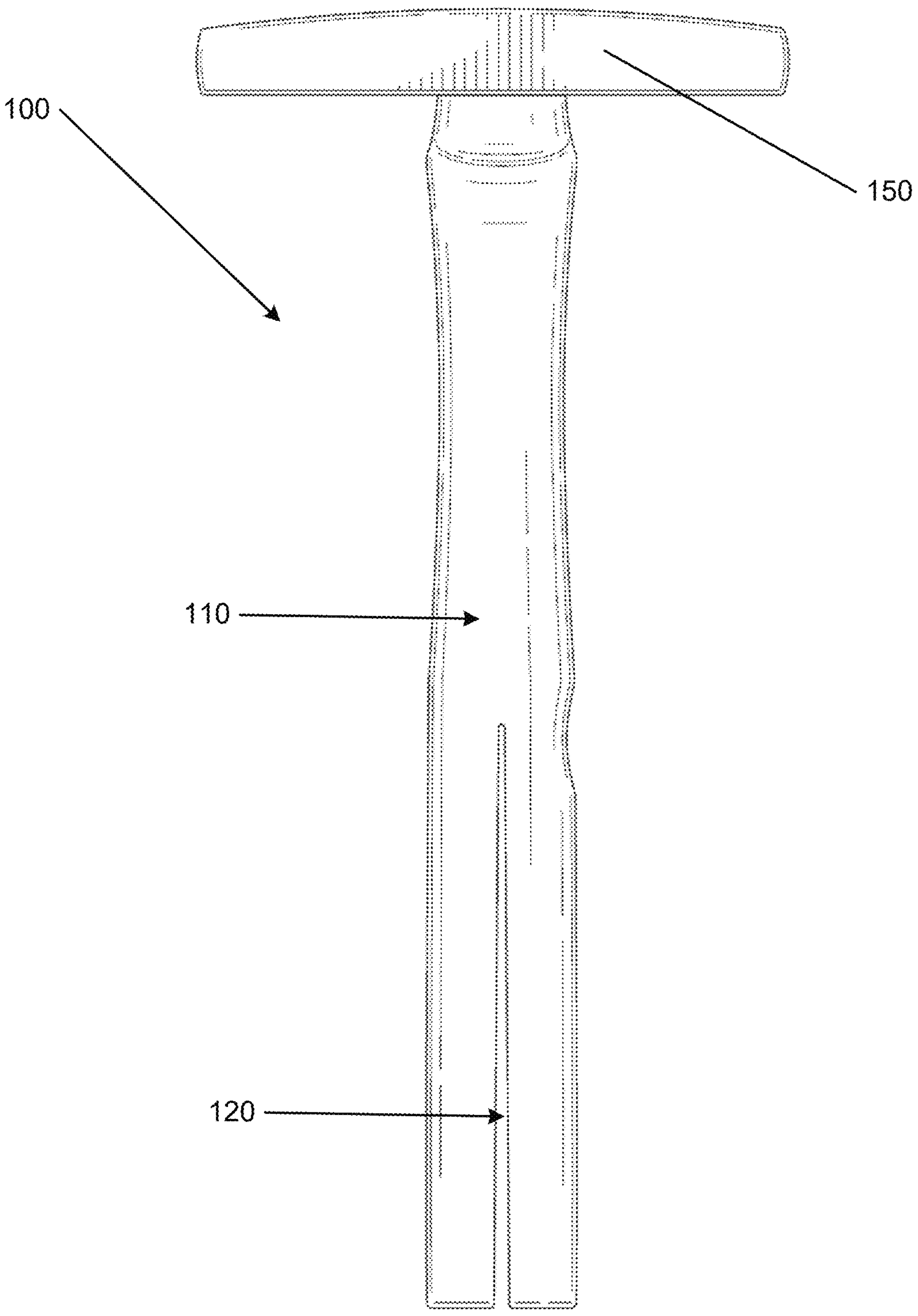
Figure 10:
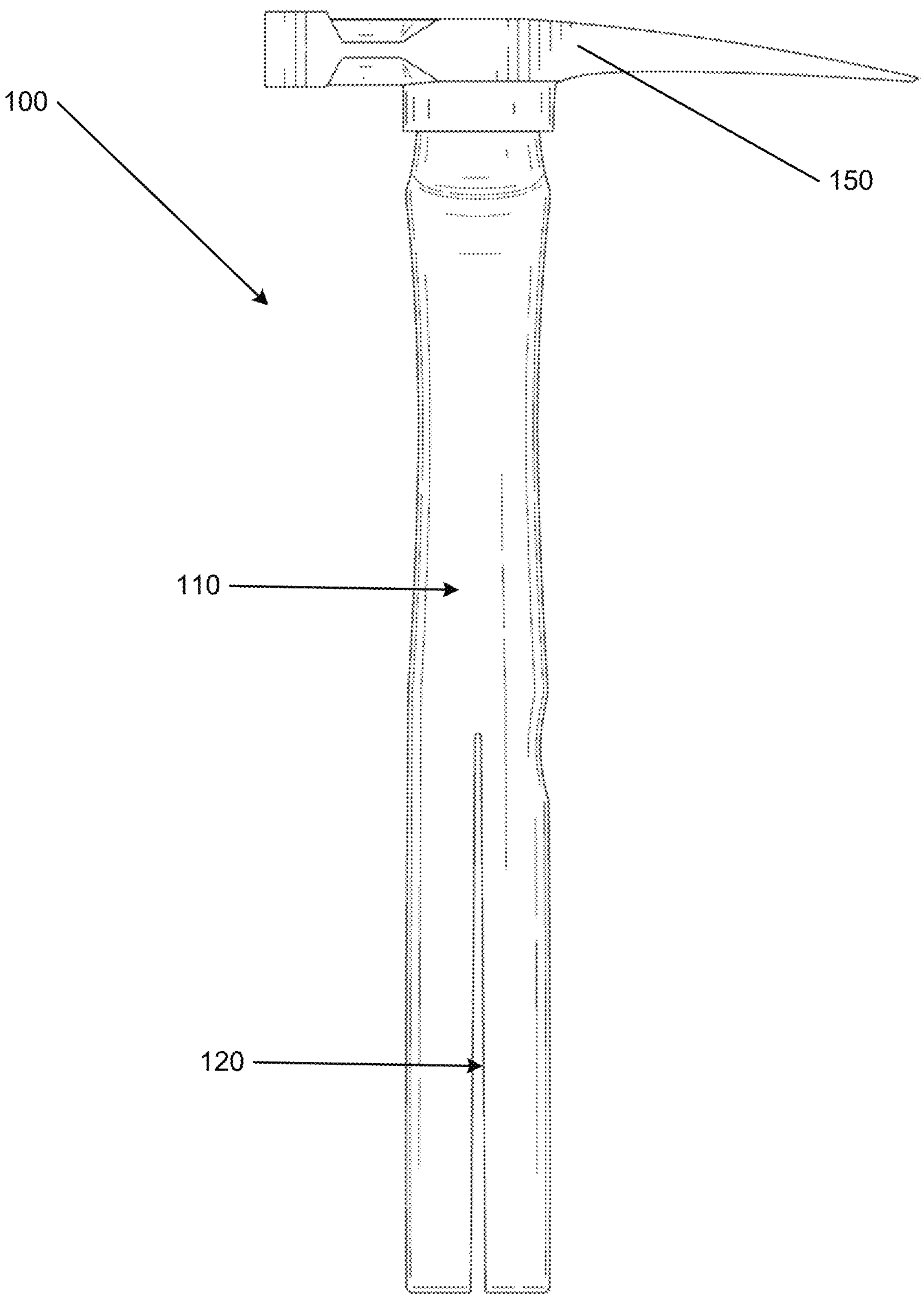
Figure 11:
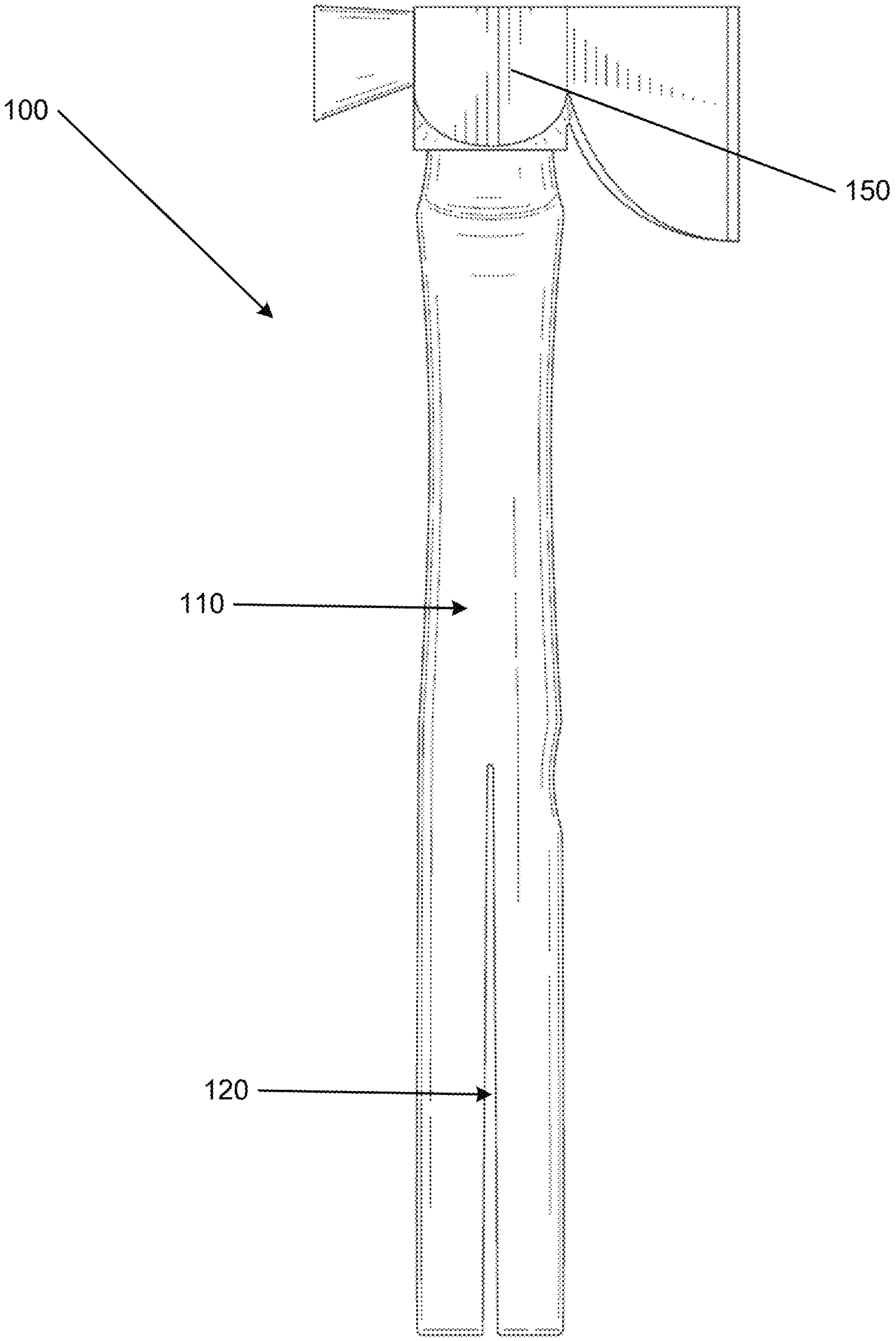
Figure 12:
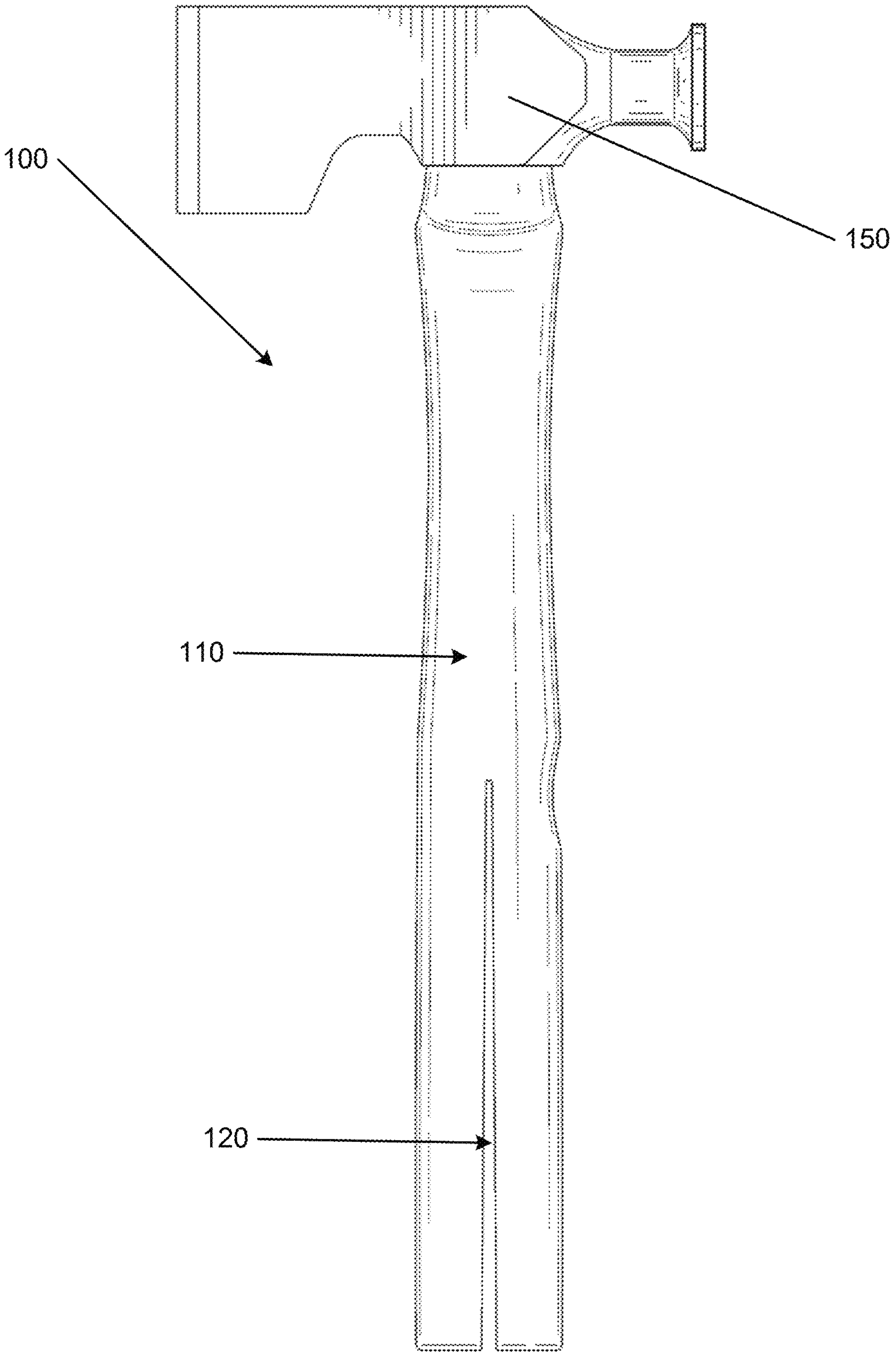
Figure 13:
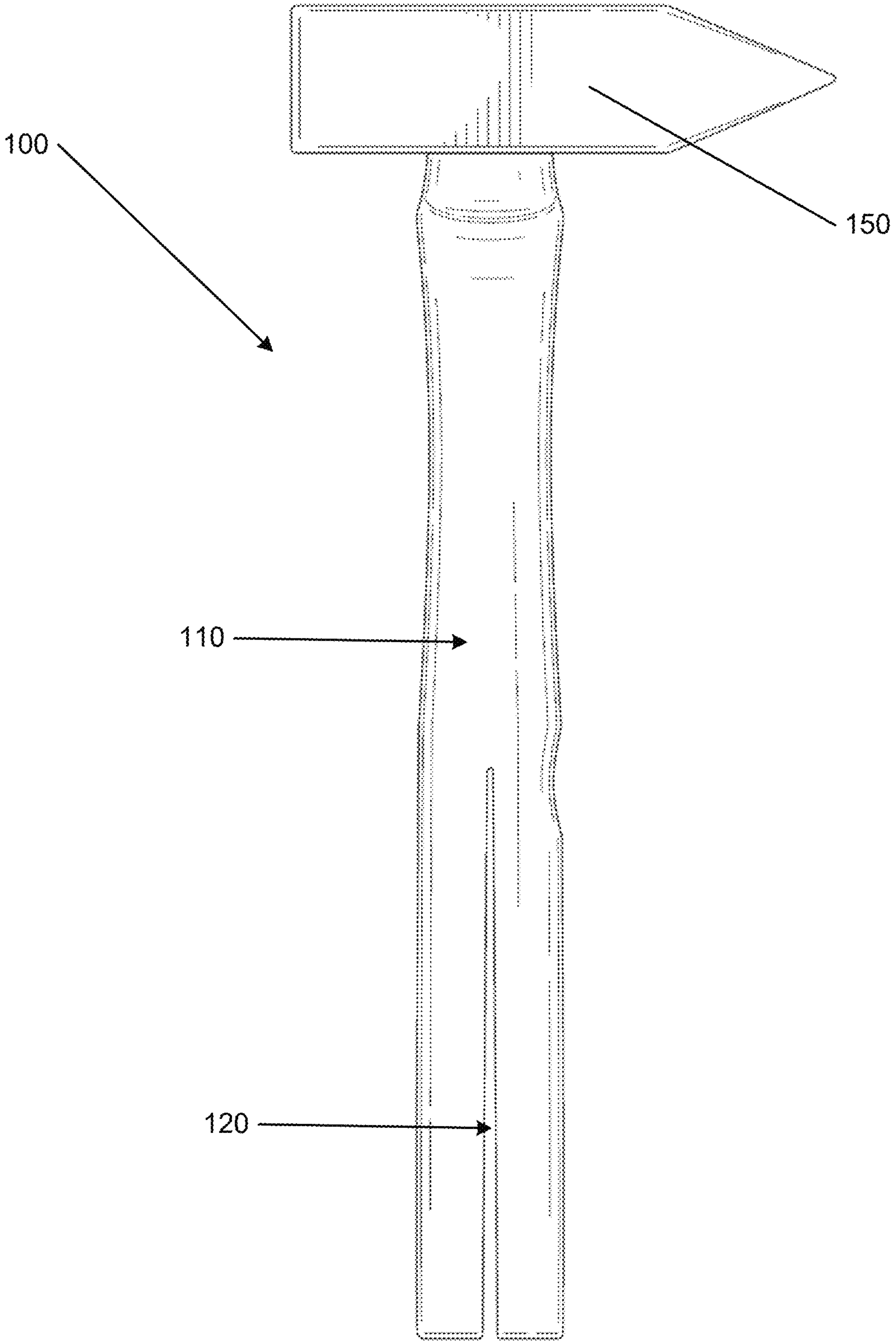
Figure 14:
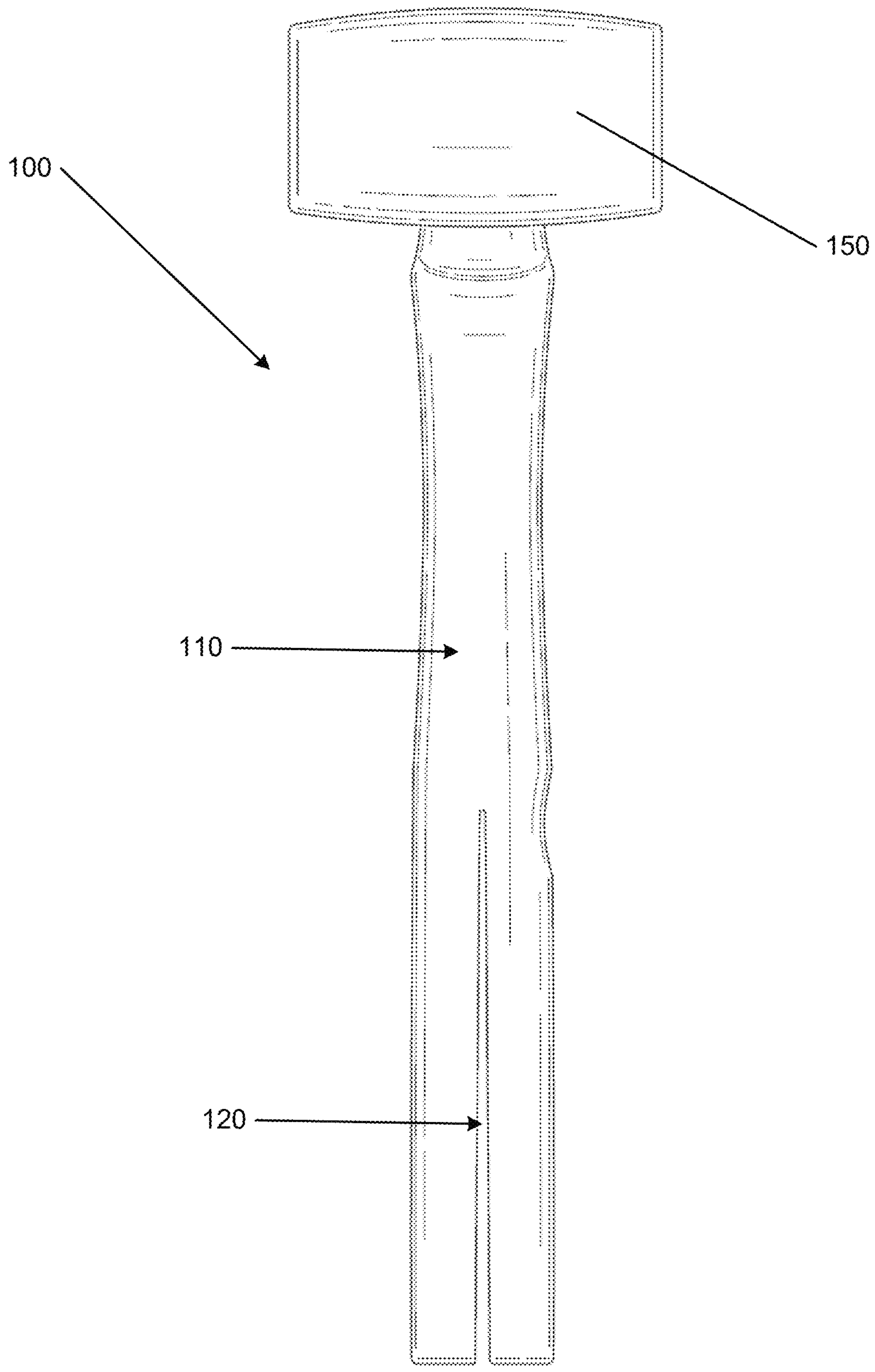
Figure 15:
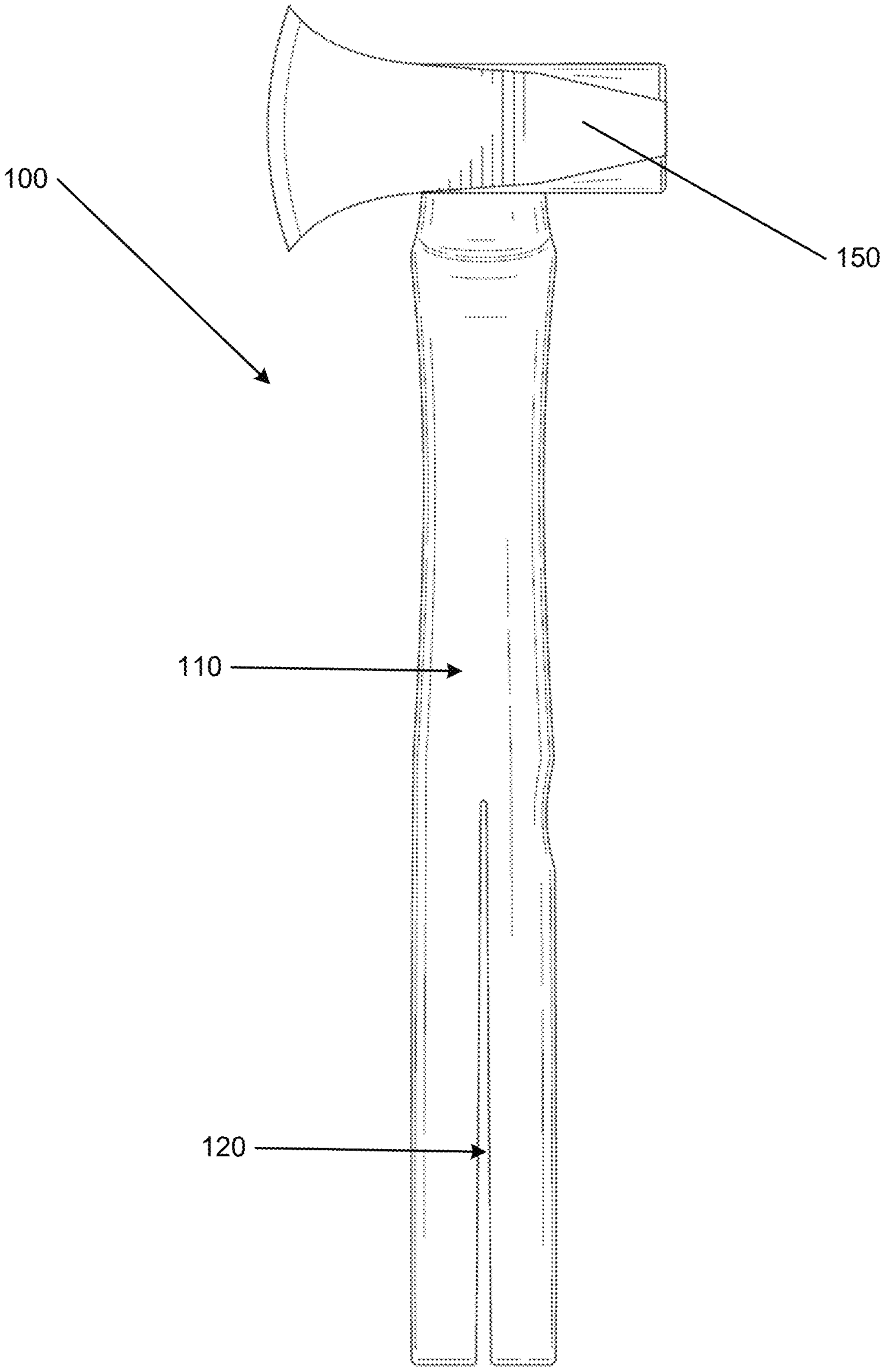
Figure 16:
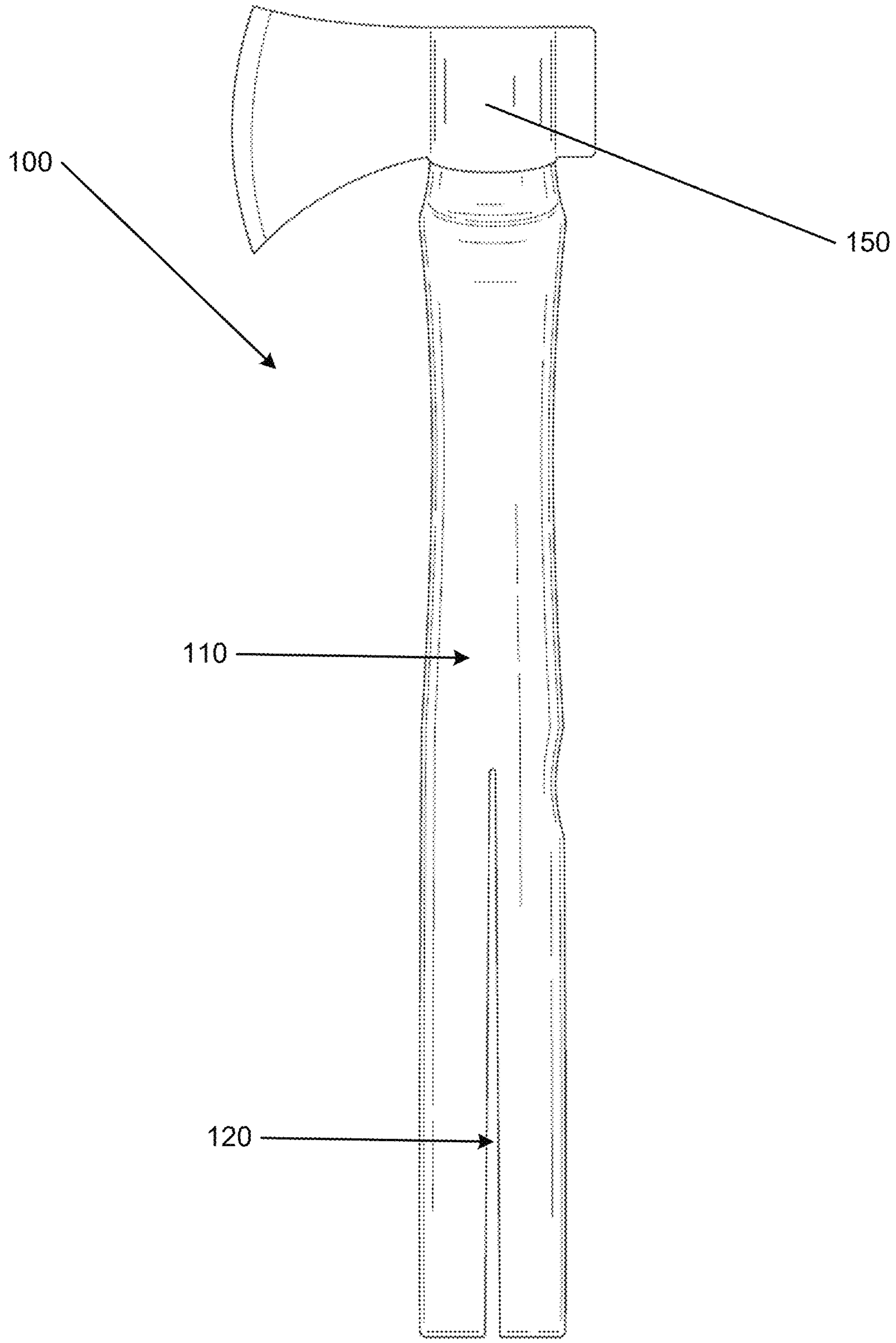

As depicted in FIGS. 5A and 5B, the bottom end 116 defines a generally circular cross-sectional profile bisected by the central gap 120. As shown in FIGS. 5A and 5B, the central gap 120 may be defined as a central longitudinal slot 126 that extends axially inward from the distal end or the bottom end 116. The slot 126 may separate the bottom end 116 into two opposing arcuate sections 128, 130. Each of the opposing arcuate sections 128, 130 may include an outer curved surface 132 that forms a semi-cylindrical contour and a straight surface 134 forming the central gap 120 and slot 126. Each of the opposing arcuate sections 128, 130 may include a pair of corners 136 defined between the outer curved surface 132 and the straight surface 134.

As depicted in FIGS. 5A and 5B, the slot 126 and straight surface 134 may include edges 134A. The edges of the straight surface 134 between the slot 126 may be smoothly curved at the bottom end 116, minimizing the potential for material fracture and reducing the risk of pinching the user's hand during operation. The outer curved surface 132 of the arcuate sections 128, 130 may also include an edge 132A. The edges 132A of the outer curved surface 132 may be smoothly rounded, creating a continuous curved perimeter around the bottom end 116. The corners 136 may be adjacent the longitudinal slot 126. The corners 136 may be filleted and free of sharp angles, thereby reducing stress concentrations and enhancing durability under repeated impact loading.

The slot 126 may include an interior end 140 located within the slot and at the end of the central gap 120. The interior end 140 of the slot 126 may terminate in a curved wall 142, allowing the opposing arcuate sections 128, 130 to flex slightly when subjected to compressive or impact forces. This geometry of the opposing arcuate sections 128, 130 and the central gap 120 improves the energy-dissipating characteristics of the bottom end 116 and provides structural reinforcement of the handle 110 against cracking or splitting.

When viewed from the bottom, as shown in FIGS. 5A and 5B, the handle 110 exhibits a circular outline interrupted only by the narrow slot 126, with both the exterior perimeter and interior slot ends shaped by continuous curves and rounded corners. This configuration combines ergonomic handling, controlled deformation under impact, and resistance to fatigue, making the bottom end suitable for absorbing striking forces without compromising the structural integrity of the handle 110.

Functionality and Benefits

When the hammer 100 strikes a surface, the impact force is partially absorbed by the flexing of the handle's 100 split lower section. This tuning fork-like effect significantly reduces the shock transmitted to the user's hand, wrist, forearm, and elbow, minimizing discomfort and the risk of repetitive strain injuries. The design also reduces recoil, providing greater control and accuracy with each strike. The use of traditional materials ensures that the handle maintains the strength and reliability required for heavy-duty applications, while the innovative gap design enhances user comfort and safety.

Manufacturing Considerations

The impact reduction handle 110 may be manufactured using standard woodworking techniques, such as cutting, shaping, and sanding. The central gap 120 may be created using precision cutting tools to ensure uniformity and consistency. The curved edges 132A, 134A at the bottom of the central gap 120 and slot 126 may be formed during the shaping process to eliminate sharp corners that could pose a pinching hazard. The handle 110 may be finished and attached to the hammer head 150 using conventional methods, ensuring compatibility with existing hammer designs.

The handle 110 may be made from a single piece of hardwood, such as hickory or ash, commonly used in traditional hammer handles. The handle 110 may be formed from traditional materials and hardwood, such as hickory or ash, using standard shaping and finishing processes commonly used in the manufacture of hammer handles, ensuring durability and compatibility with existing tool designs.

Applications

As shown in FIGS. 6-16, the impact reduction handle 110 may be suitable for a wide range of swing handle tools, including hammers used in construction, woodworking, masonry, and metalworking. FIGS. 6-16 depict the impact reduction handle 110 with a wide range of swing handle tools. The design is particularly beneficial for professionals and hobbyists who engage in prolonged tool use, as it reduces fatigue and the risk of injury. The handle can be adapted for various tool sizes and types, making it a versatile solution for improving user comfort and efficiency.

The design may be extended to other tools such as axes, mallets, or sledges where swing-based impacts cause similar shock transmission issues.

Testing and empirical observations indicate that the handle 110 provide a number of benefits, such as, for example: absorbs a significant portion of impact shock; minimizes recoil; increases accuracy by reducing erratic post-impact movement, and reduces strain on the hand, wrist, forearm, and elbow.

Importantly, the innovation retains compatibility with existing hammer head designs and does not require changes to standard handle-to-head connection methods (e.g., wedged fit).

The present disclosure is disclosed above and in the accompanying drawings with reference to a variety of examples. The purpose served by the disclosure, however, is to provide examples of the various features and concepts related to the disclosure, not to limit the scope of the invention. One skilled in the relevant art will recognize that numerous variations and modifications may be made to the examples described above without departing from the scope of the present disclosure.

I claim:

1. A swing-handle tool comprising:

a tool head; and an impact reduction handle having a first end coupled to the tool head and a second end opposite the first end, wherein the second end includes a central gap extending axially from a bottom end of the handle toward the first end, the central gap dividing a lower portion of the handle into two parallel prongs configured to flex laterally during impact so as to reduce transmission of shock forces to a user, wherein the bottom end of the handle has a generally circular cross-section bisected by the central gap, wherein the bottom end comprises two opposing arcuate sections each having an outer curved surface and an inner straight surface defining the central gap, and wherein the outer curved surfaces include peripheral edges that are smoothly rounded to create a continuous curved perimeter at the bottom end.

2. The swing-handle tool of claim 1, wherein the central gap extends approximately halfway along a length of the handle.

3. The swing-handle tool of claim 1, wherein the central gap has a width between about ⅛ inch and about ½ inch.

4. The swing-handle tool of claim 1, wherein the central gap defines a longitudinal slot terminating at an interior end with a curved wall to facilitate flexing of the prongs.

5. The swing-handle tool of claim 1, wherein the inner straight surfaces include opposing edges adjacent the slot, the edges being smoothly curved at the bottom end to minimize fracture risk and reduce pinching during use.

6. The swing-handle tool of claim 1, wherein each of the opposing arcuate sections includes corners defined between the outer curved surface and the inner straight surf ace, the corners being filleted to reduce stress concentrations.

7. The swing-handle tool of claim 6, wherein the corners are free of sharp angles and smoothly contoured to minimize fracture risk and improve user safety.

8. The swing-handle tool of claim 1, wherein the lower portion of the handle is configured to absorb secondary striking forces without structural failure.

9. The swing-handle tool of claim 1, wherein the central gap provides a tuning-fork-like effect that dissipates energy through flexural vibration.

10. A method of reducing impact shock in a swing-handle tool, the method comprising:

providing a handle having a central gap extending axially from a bottom end of the handle toward an opposite end coupled to a tool head;

dividing a lower portion of the handle into two prongs separated by the central gap; and absorbing and dissipating shock forces by flexing of the prongs during impact to reduce transmission of the shock forces to a user's hand; and shaping corners of the prongs with fillets and rounded edges to reduce stress concentrations during repeated impact loading.

11. The method of claim 10, further comprising terminating the central gap in a curved wall to facilitate controlled flexing of the prongs.

12. The method of claim 10, wherein the flexing of the prongs generates a tuning-fork-like vibration that dissipates impact energy.

13. A hammer comprising:

a hammer head; and an impact reduction handle coupled to the hammer head, wherein the handle includes a bottom end having a generally circular cross-section bisected by a longitudinal slot extending axially upward from the bottom end to divide the handle into two arcuate prongs, the prongs being configured to flex during impact to reduce transmission of shock forces, the longitudinal slot is approximately ¼ inch in width and extends approximately halfway up the length of the handle, wherein the arcuate prongs each include outer curved surfaces and inner straight surfaces defining the slot, the outer curved surfaces and inner straight surfaces including rounded edges to reduce fracture risk, and wherein each of the arcuate prongs includes corners defined between the outer curved surface and the inner straight surface, the corners being filleted, free of sharp angles, and smoothly contoured to minimize fracture risk and improve user safety.

14. The hammer of claim 13, wherein the longitudinal slot terminates at a curved interior wall that facilitates flexing of the prongs during impact.

15. A swing-handle tool comprising:

a tool head; and an impact reduction handle having a first end coupled to the tool head and a second end opposite the first end, wherein the second end includes a central gap extending axially from a bottom end of the handle toward the first end, the central gap dividing a lower portion of the handle into two parallel prongs configured to flex laterally during impact so as to reduce transmission of shock forces to a user, wherein the bottom end of the handle has a generally circular cross-section bisected by the central gap, wherein the bottom end comprises two opposing arcuate sections each having an outer curved surface and an inner straight surface defining the central gap, and wherein each of the opposing arcuate sections includes corners defined between the outer curved surface and the inner straight surf ace, the corners being filleted to reduce stress concentrations.

16. The swing-handle tool of claim 15, wherein the central gap extends approximately halfway along a length of the handle and has a width between about ⅛ inch and about ½ inch.

17. The swing-handle tool of claim 15, wherein the central gap defines a longitudinal slot terminating at an interior end with a curved wall to facilitate flexing of the prongs.

18. The swing-handle tool of claim 15, wherein the inner straight surfaces include opposing edges adjacent the slot, the edges being smoothly curved at the bottom end to minimize fracture risk and reduce pinching during use.

19. The swing-handle tool of claim 15, wherein the corners are free of sharp angles and smoothly contoured to minimize fracture risk and improve user safety.

20. The swing-handle tool of claim 15, wherein the central gap provides a tuning-fork-like effect that dissipates energy through flexural vibration.

* * * * *